United States Patent
Salmen et al.

(10) Patent No.: US 9,421,901 B2
(45) Date of Patent: Aug. 23, 2016

(54) POWER-DRIVEN VEHICLE HAVING AT LEAST ONE CAMERA AND AT LEAST ONE LAMP

(75) Inventors: Jens Salmen, Bad Driburg (DE); Michael Hartmann, Waldachtal (DE)

(73) Assignee: HELLA KGAA, Lippstadt (DE)

( * ) Notice: Subject to any disclaimer, the term of this patent is extended or adjusted under 35 U.S.C. 154(b) by 949 days.

(21) Appl. No.: 13/359,264

(22) Filed: Jan. 26, 2012

(65) Prior Publication Data

US 2012/0256544 A1 Oct. 11, 2012

(51) Int. Cl.
*B60Q 1/26* (2006.01)
*B60Q 1/00* (2006.01)
*B60Q 1/22* (2006.01)

(52) U.S. Cl.
CPC ............... *B60Q 1/0088* (2013.01); *B60Q 1/22* (2013.01); *B60Q 1/26* (2013.01)

(58) Field of Classification Search
CPC ... H04N 5/2357; H04N 5/235; Y02B 20/202; Y02B 20/204
See application file for complete search history.

(56) References Cited

U.S. PATENT DOCUMENTS

| | | | | |
|---|---|---|---|---|
| 6,426,569 | B1* | 7/2002 | Ichikawa et al. | 307/10.1 |
| 2009/0167077 | A1* | 7/2009 | Tsuchiya | B60K 1/04 307/9.1 |
| 2009/0267409 | A1* | 10/2009 | Shima | B60R 11/02 307/1 |
| 2011/0025989 | A1* | 2/2011 | Ono | H05B 41/2928 353/85 |
| 2011/0169410 | A1* | 7/2011 | Dassanayake | F21S 48/1136 315/82 |

* cited by examiner

*Primary Examiner* — Sibin Chen
(74) *Attorney, Agent, or Firm* — Husch Blackwell LLP

(57) ABSTRACT

The invention relates to a power-driven vehicle having at least one camera and at least one lamp, wherein the camera is provided to photograph at least part of the surrounding area of the power-driven vehicle, the lamp is used to illuminate at least sections of part of the surrounding area of the power-driven vehicle, and the lamp can be supplied by a power supply medium of the power-driven vehicle with power having a first frequency to generate the light.

8 Claims, 1 Drawing Sheet

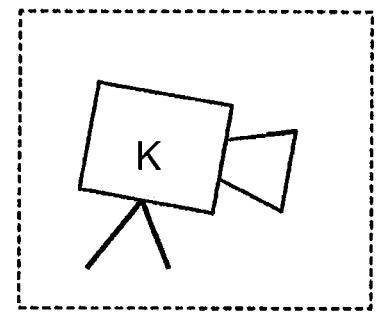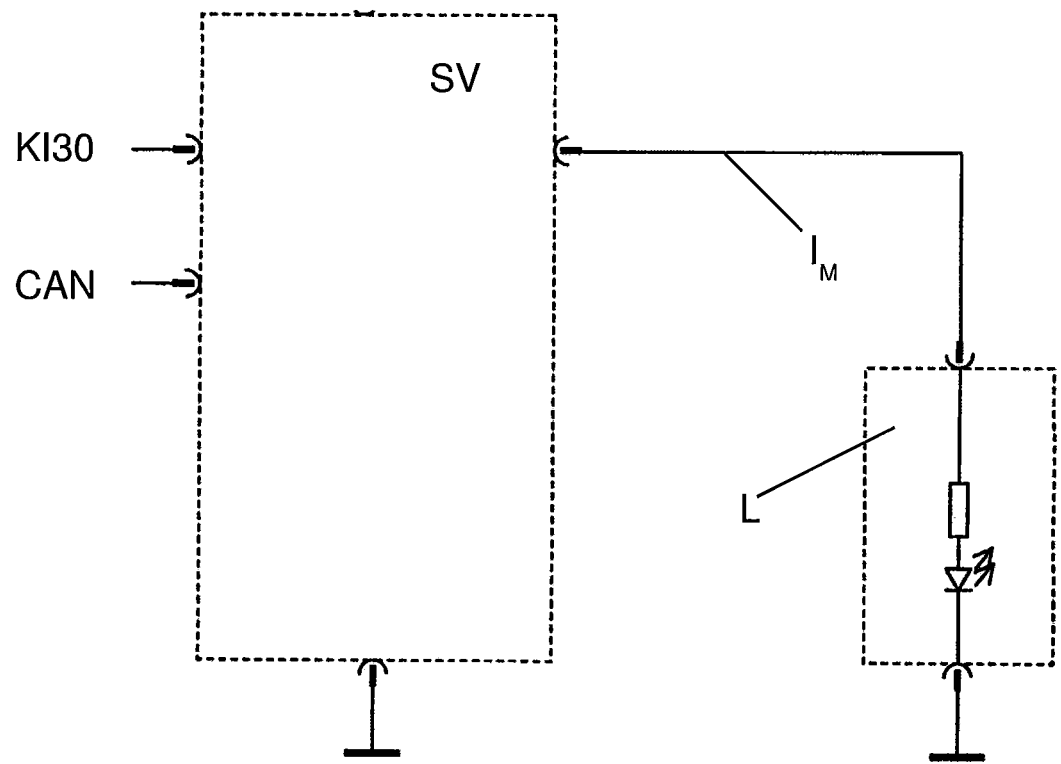

POWER-DRIVEN VEHICLE HAVING AT LEAST ONE CAMERA AND AT LEAST ONE LAMP

RELATED APPLICATIONS

This application claims priority to German Patent Application No. 102011000358.4, filed Jan. 27, 2011.

BACKGROUND OF THE INVENTION

The invention relates to a power-driven vehicle having at least one camera and at least one lamp,
1) wherein the camera is provided to photograph at least part of the surrounding area of the power-driven vehicle,
2) wherein the lamp is used to illuminate at least sections of said part of the surrounding area of the power-driven vehicle and
3) wherein the lamp can be supplied by a power supply medium of the power-driven vehicle with power having a first frequency to generate the light.

Furthermore, the invention relates to a power supply medium for one or a plurality of lamps of a power-driven vehicle.

RELATED ART

Lamps of a lighting system of a power-driven vehicle are increasingly being fitted with light-emitting diodes serving as lights. Especially for tail lamps, the use of light-emitting diodes serving as lights is very common. Lamps of a power-driven vehicle equipped with light-emitting diodes are generally supplied with a constant voltage. The pulse width of the power supplied to the light-emitting diodes is modulated to adjust different lamp brightness intensities. The performance and hence the brightness of the lamps can be adjusted by setting a pulse-duty factor of the pulse width modulated power. The impulse frequency of the pulse width modulated power is usually 100 Hz.

Many modern power-driven vehicles are equipped with a backup camera serving as an assistance system for the driver. The backup cameras are electronic cameras which generate digital images. The pictures are digitally processed in an image processing unit. Disruptive manifestations on the image are removed in the process. Said manifestations include for instance the flickering of the images which occurs when the part of the surrounding area of the power-driven vehicle photographed by the camera is illuminated by means of a fluorescent lamp connected to the commonly used 50 Hz or 60 Hz frequencies of electric power grids. The flickering of images displayed to the driver can be prevented by compensating the flickering with 50 Hz or 60 Hz frequency filters of the image processing unit. Because of the varying supply frequencies, the image processing unit is set up in such a way that it either filters the 60 Hz frequency flicker or the 50 Hz frequency flicker. A corresponding switch of the image processing unit is therefore provided.

Flickering of the images photographed by the backup camera can also occur if the parts of the surrounding area of the power-driven vehicle photographed with the camera are illuminated by means of a lamp equipped with light-emitting diodes and the brightness of the lamp is adjusted by means of a pulse width modulating power. The frequency of impulses of the pulse width modulated power transmitting the electrical energy appears as a flicker on the image photographed by the backup camera.

If the filter of the image processing unit is syntonized to a supply frequency of 50 Hz, the flicker of the pulse width modulated power (100 Hz) is equally compensated, because said filter is capable of filtering the 50 Hz frequency as well as integral multiples of said frequency. In contrast, if the filter of the image processing unit is syntonized to the supply frequency of 60 Hz, the filter is unable to compensate the flicker caused by the pulse width modulated power.

SUMMARY OF THE INVENTION

Therefore, the object of the invention is to upgrade a power-driven vehicle and a power supply medium in such a way that a flickering of the image photographed by the camera caused by supply frequencies of 50 Hz or 60 Hz or by the pulse width modulation of the supply power of the lamp can be compensated effectively.

According to the invention, this object is solved with a power-driven vehicle having the properties of claim 1 and with a power supply medium having the properties of claim 7.

The power supply medium of a power-driven vehicle according to the invention can supply the lamp of the power-driven vehicle with power in which the first frequency has a value of 300 Hz. The number 300 is the smallest common integral multiple of the numbers 50 and 60. Consequently, filters syntonized to 50 Hz or 60 Hz frequencies can compensate flickering caused by power with a frequency of 300 Hz. In other words, if the impulse frequency of the pulse width modulated current to supply the lamp is 300 Hz, the flickering it induces is effectively compensated with the filters syntonized to 50 or 60 Hz of the image processing unit.

Furthermore, to generate light, the lamp can be supplied by the power supply medium with power having a second frequency with a value of for instance 100 Hz. It is particularly advantageous if the lamp is supplied with power having the first frequency (300 Hz) in connection with the engaged reverse gear and turned on backup camera and with power having the second frequency (e.g. 100 Hz) in connection with the engaged forward gear and turned off backup camera. Aside from 100 Hz, the value of the second frequency can also be 90 Hz, 125 Hz or similar.

The lamp can be a lamp equipped with one or a plurality of light-emitting diodes provided as lights. The lamp can be a tail lamp, in particular a reversing lamp, a flashing rear lamp, a rear parking lamp, a brake lamp, a rear fog lamp and/or a license plate lamp. The camera can be a backup camera.

Power supply media according to the invention for one or a plurality of lamps of a power-driven vehicle according to the invention comprise a control system used to set a frequency of power to be supplied by the power supply medium.

A power supply medium according to the invention can comprise a d. c. converter.

The power supply medium can comprise pulse width modulation elements used for pulse width modulation of the power to be supplied by the power supply medium, for instance to adjust the brightness of the lamp. The impulse frequency of the pulse width modulated power to be supplied by the power supply medium can be adjusted with the control system of the power supply medium.

The power supply medium can comprise an input to which a signal can be connected which can be processed as a signal by the control system, which displays the status of an engaged reverse or forward gear.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The invention is explained in detail based on the attached drawings.

DETAILED DESCRIPTION OF THE PREFERRED EMBODIMENT

FIG. 1 shows an arrangement of a power-driven vehicle according to the invention, consisting of a power supply medium according to the invention, a backup camera and a license plate lamp.

The arrangement of a power-driven vehicle according to the invention illustrated in FIG. 1 comprises a power supply medium SM according to the invention, a backup camera C and a license plate lamp L. The backup camera C and the license plate lamp L are arranged at the tail end of the power-driven vehicle. The purpose of the backup camera C is to at least partially photograph the surrounding area behind the vehicle when the power-driven vehicle is reversed. The photographed image is fed to an image processing unit (not illustrated) and displayed on a monitor at the driver's seat. This allows the driver to monitor the area behind the power-driven vehicle when reversing the vehicle.

To prevent a flickering of the image displayed on the monitor, the image processing unit is provided with a filter syntonized to 50 Hz or 60 Hz and multiples of 50 Hz or 60 Hz. The filter is syntonized to 50 Hz or 60 Hz according to the supply frequency of the public power supply in the surrounding area of the power-driven vehicle.

The license plate lamp L also illuminates part of a section of the surrounding area of the power-driven vehicle photographed by the camera C. The license plate lamp L is a lamp having at least one light-emitting diode serving as a light. To adjust the brightness of the light-emitting diode, the light-emitting diode is supplied with pulse width modulated power $I_M$ supplied by the power supply medium SM. The brightness of the light-emitting diode can be adjusted with the pulse-duty factor of the modulation. In the process, the impulse frequency of the power is 100 Hz with engaged forward gear and 300 Hz with engaged reverse gear. In order to be able to recognize the engaged forward gear or the engaged reverse gear, the power supply medium SM has an input where a signal containing the information about the respective engaged gear can be scanned in. Said input shall be one that only allows scanning of this information. Alternatively, this can be a CAN bus interface on which the information about the respective engaged gear is available.

The power supply medium SM draws the electrical energy required to supply the license plate lamp L from the supply system of the power-driven vehicle by way of a CI30 adapter and a connection to ground.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

The invention claimed is:

1. A power-driven vehicle, said power-driven vehicle comprising:
   at least one camera and at least one lamp;
   wherein the camera photographs at least part of the surrounding area of the power-driven vehicle;
   wherein the lamp is used to illuminate at least sections of said part of the surrounding area of the power-driven vehicle;
   wherein the lamp can be supplied by a power supply medium of the power-driven vehicle with power having a first frequency to generate the light, and the first frequency has a value of 300 Hz;
   wherein the lamp can alternatively be supplied by a power supply medium with power having a second frequency with a value of 100 Hz; and
   wherein the lamp can be supplied with power having the first frequency if the reverse gear is engaged and with power having the second frequency if the forward gear is engaged.

2. The power-driven vehicle according to claim 1, wherein the lamp is a lamp equipped with one or a plurality of light-emitting diodes serving as lights.

3. The power-driven vehicle according to claim 1, wherein the lamp is at least one of a reversing lamp, a flashing rear lamp, a rear parking lamp, a brake lamp, a rear fog lamp and a license plate lamp.

4. The power-driven vehicle according to claim 1, wherein the camera is a backup camera.

5. The power-driven vehicle according to claim 1, wherein a frequency of the power to be provided by the power supply medium can be adjusted by means of a control system of the power supply medium.

6. The power-driven vehicle according to claim 5, wherein the power supply medium comprises a d. c. converter.

7. The power-driven vehicle according to claim 5, wherein the power supply medium comprises elements for pulse width modulation used to modulate the pulse width of the power to be supplied by the power supply medium, and wherein the impulse frequency of the pulse width modulated power to be provided by the power supply medium can be adjusted by means of a control system of the power supply medium.

8. The power-driven vehicle according to claim 5, wherein the power supply medium has an input to which a signal can be connected which can be processed as a signal by the control system, which displays the status of an engaged reverse or forward gear.

* * * * *